March 24, 1970     H. J. HANSEN     3,502,111
DISPENSING DEVICE
Filed Oct. 14, 1965

INVENTOR.
HOWARD J. HANSEN
BY Hoffmann and Yours
ATTORNEYS

United States Patent Office 3,502,111
Patented Mar. 24, 1970

3,502,111
DISPENSING DEVICE
Howard J. Hansen, Bay Village, Ohio, assignor to The Hansen Manufacturing Company, Cleveland, Ohio, a corporation of Ohio
Continuation-in-part of application Ser. No. 369,186, May 21, 1964. This application Oct. 14, 1965, Ser. No. 496,068
Int. Cl. F15d 1/00; F16k 47/16; B67d 1/14
U.S. Cl. 138—46                             4 Claims

ABSTRACT OF THE DISCLOSURE

A fluid dispensing device has a body member which defines a flow restrictor chamber and a flow restrictor is located within the flow restrictor chamber. The flow restrictor chamber is defined in part by a conically shaped inlet end portion which receives a conically shaped portion of the flow restrictor. The surface which defines the conically shaped inlet portion extends at an angle greater than the angle formed between the surface defining the conical portion of the flow restrictor and the axis of the flow restrictor. A plurality of rib members are positioned between these conical surfaces. The rib members function to reduce foaming and noise during dispensing of the fluid.

---

This application is a continuation-in-part application of application Ser. No. 369,186, filed May 21, 1964, now Patent No. 3,291,441, and which, in turn, is a continuation-in-part of application Ser. No. 284,282, filed May 29, 1963 and now abandoned.

The present invention relates to a fluid dispensing device and particularly to a dispensing device for dispensing liquids which have a high tendency to foam, such as carbonated beverages and particularly syrupy carbonated beverages.

Prior art dispensing devices for dispensing liquids having a high tendency to foam include a flow restrictor located in a flow restrictor chamber which forms a part of the fluid passageway extending through the dispensing device. The flow restrictor functions to minimize foaming of the liquid when it is dispensed. The prior art dispensing devices, however, have been subject to the problems of noise and fluid foaming which result when fluid flows around the flow restrictor causing vibration thereof. The present invention is particularly directed to the solution of this noise and foaming problem resulting from the vibrating flow restrictor.

Accordingly, the principal object of the present invention is the provision of a fluid dispensing device having a body portion providing a flow restrictor chamber and a flow restrictor located therein and constructed so as to minimize noise and foaming caused by the flow of fluid through the device and around the flow restrictor.

A more specific object of the present invention is the provision of a new and improved dispensing device having a body member defining a flow restrictor chamber having a tapered inlet portion and a flow restrictor with a tapered portion received in the tapered inlet portion of the flow restrictor chamber, and wherein ribs are located between the tapered portions of the flow restrictor and the flow restrictor chamber so as to properly locate the flow restrictor in the chamber and provide a smooth fluid flow through the flow restrictor chamber and with a minimum of noise and foaming.

A further object of the present invention is the provision of a new and improved dispensing device having a body member having a flow restrictor chamber and a flow restrictor supported in the chamber and wherein the fluid flowing through the chamber causes the flow restrictor to be located against an abutment which is movable for adjustment purposes and wherein the flow restrictor chamber has a tapered inlet portion and receives a tapered portion of the flow restrictor and a plurality of ribs are located between the tapered portion of the flow restrictor and the tapered inlet portion of the flow restrictor chamber and provide a stop limiting the movement of the flow restrictor into the chamber.

Further objects and advantages of the present invention will be apparent to those skilled in the art to which it relates from the following detailed description thereof made with reference to the acompanying drawings forming a part of this specification, and in which.

Figure 1:
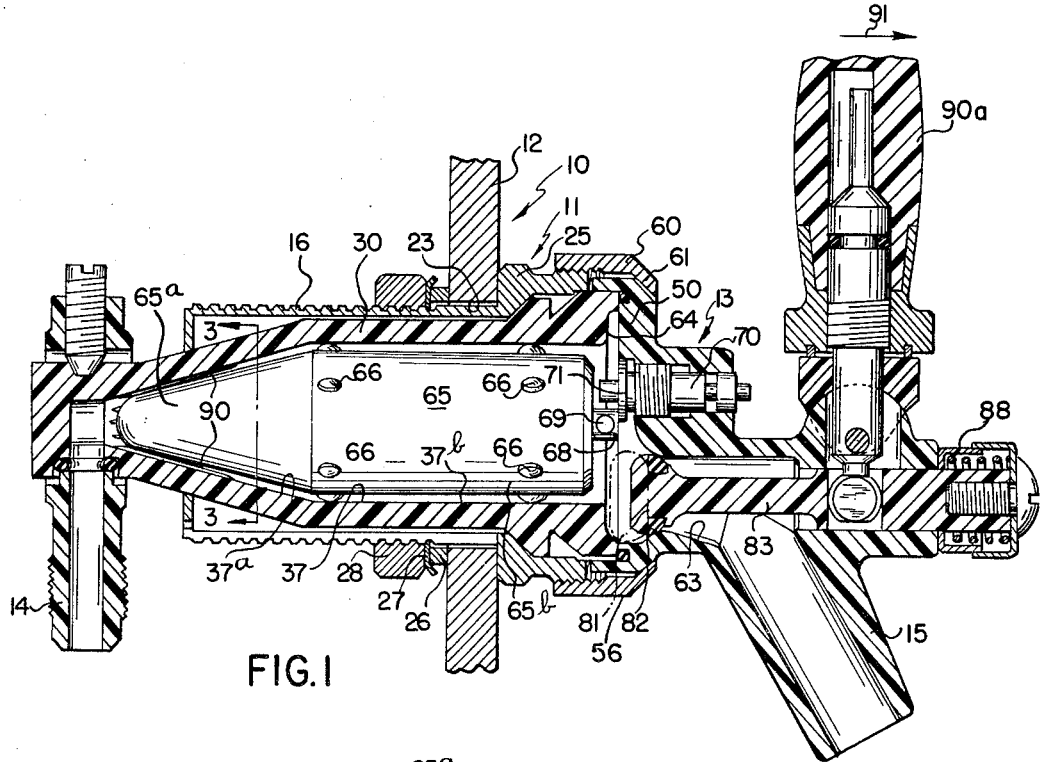
FIG. 1 is an axial sectional view of a dispensing device embodying the present invention.

The present invention is embodied in a dispensing device for dispensing fluids, and particularly in a dispensing device for dispensing liquids having a tendency to foam, such as syrupy carbonated beverages. As representing a preferred embodiment of the present invention, a fluid dispensing device 10 is illustrated in the drawings. The fluid dispensing device 10 has a fluid passageway extending therethrough through which fluid flows. The device 10 includes a body part 11 secured to a wall 12 or other suitable support and a faucet portion or part 13 suitably secured to the body part 11. The body 11 is suitably connected with a fluid supply connection 14 which connects the dispensing device 10 to a supply of fluid to be dispensed, and the faucet portion 13 is provided with a suitable fluid outlet 15 in the form of a nozzle through which the fluid is normally dispensed into a suitable container positioned thereunder upon operation of the device 10.

The body 11 of the dispensing device 10 includes a housing member in the form of a hollow metal sleeve member 16 having a passageway extending therethrough. The sleeve member 16 is adapted to be positioned extending substantially horizontally through an opening 23 in the wall 12 and has a shoulder portion 25 at the forward end thereof adapted to engage one side of the wall 12, namely, the right side thereof as viewed in FIG. 1. A suitable annular rubber ring clamping member 26 encircles the sleeve member 16 and engages the side of the wall 12 opposite the side engaged by the shoulder 24. A washer 27 is positioned between the ring member 26 and a suitable nut member 28 which is threaded onto a threaded portion of the sleeve 16 and into engagement with the washer 27 and tightly clamp the ring member 26 against the left side of the wall 12, as viewed in FIG. 1.

The body 11 also includes a body or chamber member 30 which is preferably circular in cross section and made of a plastic material and is slidably received in the passageway in the hollow sleeve member 16. The rear portion of the body 30 is connected to the supply connection 14. The body member 30 has a fluid passageway extending therethrough which communicates with a passage in the fluid supply connection 14. The fluid passageway includes, in the main, a flow restrictor chamber 37 which extends substantially the entire length of the body member 30. As can readily be seen in the drawings, the flow restrictor chamber 37 has an inlet end defined by a diverging conical surface portion 37a adjacent the supply connection 14 and axially extending, continuous cylindrical surface portion 37b of uniform cross section which extends forwardly from the portion 37a. The surface portion 37b forms the outlet end of the chamber 37 and extends horizontally. The surface 37b intersects the forward end of the body portion 30, and thus the flow restrictor chamber 37 is accessible from the forward end of the body member 30. Moreover, it can be seen that the body member 30 is free of barriers, restrictions, or other obstacles which would trap fluid in the flow restrictor chamber 37.

The faucet portion 13 of the dispensing device is connected to the forward end of the body portion 11 and includes a faucet body 50. A suitable means for releasably securing the faucet body 50 to the body portion 11 and permitting disassembly of the faucet and body portions for cleaning purposes is provided. This means is in the form of a clamping nut 60 carried by the faucet body 50 and which is rotatable relative thereto. The nut 60 has a shoulder portion 61 adapted to engage a shoulder portion of the faucet body 50. The nut 60 is threaded internally and is threaded onto a male threaded portion of the sleeve member 16 in order to secure the faucet body 50 to the body 11.

The faucet body 50 has a faucet passage 63 extending substantially parallel to the passageway 36 in the body portion 30 and communicating with the outlet nozzle 15. The passage 63 is spaced forward from the flow restrictor chamber and is offset below the flow restrictor chamber 37, that is, the center of the cross section of passage 63 is not in alignment with the center of the cross section of the flow restrictor chamber 37, but rather is spaced below the center of the flow restrictor chamber. Preferably, the center of the passageway is aligned approximately with the bottom of the flow restrictor chamber. The end of the passage 63 is widened at its inlet end adjacent the body member 30 and communicates with an axially extending bore 64 formed in the shoulder 56 at the rear end of the faucet body 50. As illustrated, the inlet end of the passage 63 intersects the bottom of the bore 64. The passage 63 has a cross section which partially overlaps the flow restrictor chamber, in that the projection of the cross section of the inlet end of the passage 63 will fall over the flow restrictor chamber, as well as the end of the body member 30. From the above description, it can be seen that the flow restrictor chamber 37, the bore 64, the passage 63, and nozzle 15 provide a continuous path or passageway for directing fluid through the dispensing device 10.

In order to minimize foaming of the liquid dispensed by the device 10, a flow restrictor 65 is located in the flow restrictor chamber 37. The flow restrictor 65 is preferably a plastic torpedo-shaped member having a conical surface portion 65a, which corresponds with the portion 37a of the flow restrictor chamber 37, and a forward converging conical surface portion 65b located adjacent the forward end of the body 30 and corresponding with the portion 37b of the flow restrictor chamber. The surfaces 65a 37a may be shaped to diverge slightly as they extend forwardly from the restriction immediately at the inlet end of the flow restrictor chamber so as to provide for an inlet expansion chamber which continually increases in volume proceeding toward the outlet end.

For best control, the conical inlet surface 65a of the restrictor extends into the cylindrical portion of the chamber to provide a second restriction at the outlet end of the inlet section. While there is a restriction at this point, the volume of liquid passed is greater than that passed by the inlet restriction because of the larger diameter of the restriction. The size of the inlet expansion chamber can be adjusted by moving the restrictor axially, however the size of the second restriction and outlet chamber will be constant.

Suitable lug members 66 are located on the outer surface 65b of the flow restrictor 65 and project therefrom and engage the surface portion 37b of the flow restrictor chamber 37 to properly position the flow restrictor within the flow restrictor chamber. The flow restrictor 65 may be removed from the flow restrictor chamber 37 for cleaning purposes and has a lug 68, preferably metal, projecting forwardly therefrom to facilitate removal of the flow restrictor 65 from the chamber 37. The lug 68 has an opening 69 extending therethrough and through which a suitable tool may be projected for freeing the flow restrictor 65 and removing it from the chamber 37.

The flow restrictor 65 is axially adjustable in the flow restrictor chamber by a metal pin 70 which extends though an opening in the faucet body 50 and which has suitable threads which mesh with threads formed in the opening in the faucet body 50 through which it extends. One end of the pin 70 has a flange portion 71 which overlaps and engages the outer end of lug 68. A suitable seal is provided between the pin 70 and the opening in the faucet body portion 50 through which it extends, in order to prevent leakage therebetween. The outer end portion of the pin 70 extends to the outside of said faucet body 50 and is provided with a suitable tool receiving opening for a tool for rotating the pin 70. It should be apparent that upon rotation of the pin 70, the pin 70 moves axially and through the flange 71 effects movement of the flow restrictor axially relative to the faucet body 50 and the flow restrictor chamber 37. In the event the pin 70 is moved outwardly, the flow restrictor, of course, is not pulled outwardly. However, the fluid flowing through the device applies forces against the flow restrictor which move the flow restrictor against the flange 71. This adjustment may therefore be termed an abutment-type of adjustment.

Adjustment of the axial position of the flow restrictor 65 controls the flow of fluid and is made generally for the purpose of dispensing different beverages or for dispensing the same beverage under different conditions. Because the lug 68 is located at the center of the flow restrictor, there is no tendency to cock or break the flow restrictor when an adjustment is made. It should be noted that because of the construction of the adjustment means for the flow restrictor, the pin 70 cannot be removed accidentally from the opening in the faucet body 50 through which it extends due to the operator adjusting the flow restrictor to too great an extent.

The faucet portion 13 of the dispensing device 10 also includes a suitable faucet valve mechanism for controlling the flow of fluid through the dispensing device. The valve mechanism includes a suitable valve member 81 positioned below the flow restrictor 65 in the passage 63 at the end thereof adjacent the flow restrictor. The valve member 81 is movable and has open and closed positions relative to a valve seat 82. The valve means further includes means for moving the valve member 81 between its open and closed positions, including a valve stem 83 which supports the valve member 81 and extends axially through the fluid passage 63. The valve stem 83 is suitably connected with an actuator handle 90a which, when moved in the direction of the arrow 91 as viewed in FIG. 1, causes the valve stem 83 to move to the left, as viewed in FIG. 1, against the bias of a spring means 88 to thereby move the valve member 81 to its open position. The valve member 81 is returned to its closed position by the spring 88 upon release of the actuator handle 90a.

With the dispensing device connected to a liquid supply tank, and the valve member 81 in its closed position, liquid fills the flow restrictor chamber 37 and bore 64. When the valve member 81 is moved to its open position, it can be readily seen that fluid flows through the flow restrictor chamber 37, the bore 64, the passage 63, and nozzle 15. The flow restrictor 65 functions to minimize foaming of the fluid dispensed.

It has been discovered that a dispensing device as described above is subject to a noise problem when fluid flows therethrough, due, it is believed, to vibration of the flow restrictor in the flow restrictor chamber. This vibration also causes some foaming of the fluid being dispensed. The present invention is directed to the solution of these problems. It has been discovered that the positioning of spacer members between the tapered inlet surface 37a of the flow restrictor chamber and the tapered surface 65a of the flow restrictor minimizes the noise and foaming produced when fluid flows through the dispensing device.

As best shown in FIG. 1, the spacer members preferably are in the form of a plurality of ribs 90 located between the surface 37a of the body member 30 and the surface 65a of the flow restrictor. The ribs extend from adjacent the inlet conduit 14 along the slanted surface 37a slightly more than one-half of the length of surface 37a, and preferably are formed of plastic and integral with the body member 30. There are eight such ribs shown in the drawings.

The ribs 90 are identical in construction and, as noted hereinabove, are plastic and are formed integral with the body member 30. Each rib has a base portion connected with the body member 30 and a flow restrictor engaging surface portion 92. The height of each of the ribs 90 is substantially uniform, that is, the surface 92 is spaced equal distances from the surface 37a along the length of the rib.

Figure 2:
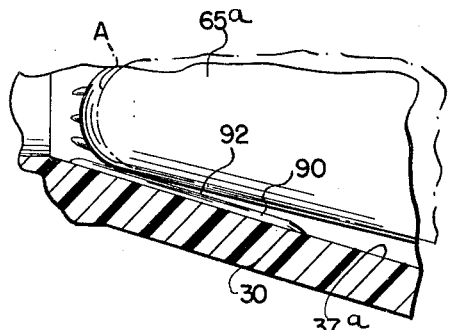
FIG. 2 is an enlarged fragmentary sectional view of the dispensing device of FIG. 1.
Figure 3:
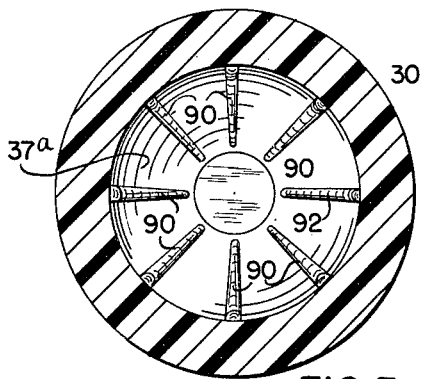
FIG. 3 is an axial sectional view of the dispensing device shown in FIG. 1, taken approximately along the section line 3—3 of FIG. 1 and with parts removed.

Moreover, the surface portion 92 of each rib engages the flow restrictor when the flow restrictor is in the position shown in full lines in FIG. 2 to locate the flow restrictor 65 relative to the body member 30 and provide for proper spacing between the surfaces 37a and 65a of the body member and flow restrictor, respectively. These engagements lie on a circumferential line only on the tapered surface 65a of the flow restrictor, and the surface 92 of each rib as it extends from its point of engagement with the surface 65a is spaced at an increasing distance from the flow restrictor 65.

As noted hereinabove, the flow restrictor is movable in the flow restrictor chamber for adjustment purposes through the construction of the former described adjustment including the pin 70. The position of the flow restrictor, as illustrated in FIG. 2, is the limit or farthest position thereof inwardly of the chamber with the abutment 71 moved inwardly to its extreme position, and it should be apparent that the ribs 90 limit the movement of the flow restrictor into the chamber and define this limit position of the flow restrictor. In the event that the abutment 71 is then moved away from the flow restrictor, the flow restrictor will then be moved when fluid flows through the device 10, so that the surface portion 65a thereof is completely spaced from the ribs 90, and does not engage the ribs 90. This position is illustrated in dot-dash lines in FIG. 2 and designated A. It has been found, however, that the ribs do provide for minimizing of the noise and foaming produced by the flow of fluid through the dispensing device in all adjusted positions of the flow restrictor.

While the preferred embodiment of the present invention has been described hereinabove in detail, it should be apparent that certain modifications, changes, and adaptations may be made therein by those skilled in the art to which it relates, and it is hereby intended to cover all such modifications, changes, and adaptations which fall within the scope of the appended claims.

Having described my invention, I claim:

1. A dispensing apparatus comprising a chamber member having a flow restrictor chamber therein, said chamber having an outlet end opening into one end of said chamber and an inlet end communicating with the other end of said member, a flow restrictor in said chamber, said chamber having an inlet end which is conically shaped and defines a predetermined angle with the axis of the chamber and said flow restrictor has a conically shaped surface at its inlet end which is adapted to be received in the inlet end of said flow restrictor chamber with the angle of said surface with respect to the restrictor axis being less than said predetermined angle, and spacer members located between said conically shaped inlet end of said chamber and said conically shaped surface on said flow restrictor.

2. A dispensing device as defined in claim 1 wherein said spacer members comprise a plurality of circumferentially spaced ribs connected to said member and extending therefrom a uniform height throughout their length.

3. A dispensing apparatus for dispensing a fluid having a tendency to foam comprising a body member having a flow restrictor chamber therein, said flow restrictor chamber having an outlet end defined by a first surface of said body member and a conically shaped inlet end defined by a conical second surface of said body member, a flow restrictor located in said flow restrictor chamber, said flow restrictor having a portion defined by a first surface received in said outlet end of said flow restrictor chamber and another portion defined by a conical second surface received in said conically shaped inlet end of the flow restrictor chamber and around which fluid flows, said fluid flow acting against said flow restrictor tending to move said flow restrictor out of said inlet end of said flow restrictor chamber to increase the distance between the conical inner second surface of said body member and the conical second surface of said flow restrictor, an abutment member engageable with a portion of said flow restrictor forwardly of said conical surface to limit movement of said flow restrictor by said fluid flow, means for adjusting the position of said abutment member to determine the position of said flow restrictor in said chamber, spaced locating members located between said first surfaces to locate said flow restrictor in said chamber and constraining said flow restrictor to move axially of said conical second surfaces by said fluid force, and spacer members located between said conical second surfaces and effective to provide a minimum size space between said conical second surfaces.

4. A dispensing device as defined in claim 3 wherein said conical second surfaces are tapered at different angles and the space therebetween increases as they extend into the flow restrictor chamber and said spacer members comprise ribs which are connected to said body member and extend therefrom a uniform distance throughout the length thereof.

References Cited

UNITED STATES PATENTS

| | | | |
|---|---|---|---|
| 1,340,769 | 5/1920 | Holderle | 138–42X |
| 1,496,145 | 6/1924 | Brown | 251–333 |
| 2,297,535 | 9/1942 | Bryant | 251–333 |

LAVERNE D. GEIGER, Primary Examiner

EDWARD J. EARLS, Assistant Examiner

U.S. Cl. X.R.

137—170.1; 251—120